United States Patent
Sun

(10) Patent No.: US 9,950,816 B2
(45) Date of Patent: Apr. 24, 2018

(54) POWDER OUTPUT DEVICE

(71) Applicant: Mingwen Qin, Guangzhou (CN)

(72) Inventor: Guomin Sun, Guangzhou (CN)

(73) Assignee: Mingwen Qin, Guangdong Province (CN)

( * ) Notice: Subject to any disclaimer, the term of this patent is extended or adjusted under 35 U.S.C. 154(b) by 29 days.

(21) Appl. No.: 15/086,084

(22) Filed: Mar. 31, 2016

(65) Prior Publication Data

US 2017/0203859 A1 Jul. 20, 2017

(30) Foreign Application Priority Data

Apr. 1, 2015 (CN) .................... 2015 2 0192218 U

(51) Int. Cl.
*B65B 1/08* (2006.01)
*B65D 83/06* (2006.01)

(52) U.S. Cl.
CPC .............. *B65B 1/08* (2013.01); *B65D 83/06* (2013.01)

(58) Field of Classification Search
CPC .................................. B65B 1/08; B65D 83/06
USPC ........ 222/226, 236, 196, 197, 410, 367, 368
See application file for complete search history.

(56) References Cited

U.S. PATENT DOCUMENTS

| | | | | |
|---|---|---|---|---|
| 2,612,298 A | * | 9/1952 | Wearne | C10B 31/04 202/262 |
| 4,083,462 A | * | 4/1978 | Teske | B65G 65/4836 222/239 |
| 2005/0098586 A1 | * | 5/2005 | Jensen | B65G 53/4633 222/367 |
| 2007/0170209 A1 | * | 7/2007 | Lehmann | B01F 7/162 222/236 |
| 2013/0146619 A1 | * | 6/2013 | Ozawa | B65G 65/46 222/236 |
| 2015/0276453 A1 | * | 10/2015 | Rusch | G01F 11/24 222/370 |

FOREIGN PATENT DOCUMENTS

GB 2217691 A * 11/1989 ......... B65G 65/4836

* cited by examiner

*Primary Examiner* — Donnell Long

(57) ABSTRACT

A powder output device, including powder storage device (1), powder dispersion device (2), powder distributor (3), and a power device (4) connected with powder dispersion device (2) and powder distributor (3). The powder distributor (3) includes a rotatory accessory (31), a main shaft (32), a shell (33), an output groove (35), and a feed inlet (39). The main shaft (32) is positioned horizontally. The rotatory accessory (31) sleeves on the main shaft (32) and is in the shell (33). At least one recess (312) corresponding to the output groove (35) and the feed inlet (39) is provided on the rotatory accessory (31).

9 Claims, 6 Drawing Sheets

POWDER OUTPUT DEVICE

BACKGROUND OF THE INVENTION

The utility model involves a powder supply device, especially a powder output device.

With the living standard constantly improved, people constantly pursue more efficient and convenient life, and the requirement on various products becomes higher and higher.

Chinese patent with application No. CN201180072756.1 issues a powder distribution device, used to distribute powder with or without liquid; powder distribution device consists of a base, distributor and tower; the mentioned base is used to place vessel; the distributor consists of a rotation support, the rotation support is connected with a supporting component with opening; the mentioned rotation support consists of several chambers; the rotation support is horizontally on an optional funnel, can rotate around the center shaft; the rotation support is placed with a hopper, connected with some chamber; every chamber can respectively distribute a powder from the hopper, infuse in the optional funnel through the opening, then enter the vessel on the base; both ends of the tower are respectively connected with the base and the distributor. At present, the bottom of this distribution device will accumulate more powders and cannot output in the operation, which causes waste, and the powder accumulated at the bottom will affect the use.

BRIEF SUMMARY OF THE INVENTION

The problem that the utility model will solve is to provide a convenient, controllable and efficient distribution of powder food with or without liquid or similar powder output device.

To solve the technical problem proposed by the utility model, the utility model issues a powder output device, consisting of powder storage device, powder dispersion device, powder distribution device, power unit, the mentioned powder dispersion device is fixed in the powder storage device, the bottom surface of the mentioned powder storage device is set with through hole, the mentioned powder distribution device is fixed under the mentioned powder storage device and the feed inlet of the powder distribution device is overlapped with the through hole of powder storage device, the mentioned powder unit is respectively connected with powder dispersion device and powder distribution device, the mentioned powder distribution device consists of rotation distribution part, main shaft, shell, output groove, feed inlet, the mentioned main shaft is horizontally set, the mentioned rotation distribution part is bell socketed on the main shaft in the shell, the rotation distribution part is set with at least one groove to correspond with the output groove and the feed inlet.

As an improvement of the utility model, spring is set in the space formed by the mentioned main shaft and rotation distribution part, the mentioned rotation distribution part is set with rotation vibration tooth, fixed vibration tooth is set inside the mentioned shell to correspond with the rotation vibration tooth.

As an improvement of the utility model, the mentioned powder dispersion device consists of rotation pick and center shaft, the mentioned rotation pick is fixed on the center shaft, the mentioned rotation pick is set at the bottom of powder storage tank, the mentioned center shaft is connected with powder unit after extending out of the bottom of powder storage tank.

As an improvement of the utility model, the mentioned center shaft is fixed with helical tooth transmission gear, the main shaft of the mentioned powder distribution device is fixed with helical gear, which is mutually meshed with helical tooth transmission gear, the mentioned helical tooth transmission gear drives the helical gear to rotate in rotation.

As an improvement of the utility model, the mentioned power unit consists of electric motor and gear box, the mentioned electric motor is connected with the power input end of gear box, the mentioned center shaft is bell socketed in the power input end of gear box.

As an improvement of the utility model, also consisting of main frame to correspond with powder storage device, the main frame consists of shell, controller, DC power adapter, supporting component, power input end and power switch, the mentioned controller, DC power adapter and supporting component are fixed in the shell, one end of the mentioned power input end is set in the shell, the other end is set out of the sell, the mentioned power switch is set on the shell, the mentioned power unit is fixed on the supporting component.

As an improvement of the utility model, the side wall of the mentioned shell is fixed with fixing rack, the fixing rack is fixed with receiving device to correspond with powder distribution device, the receiving device consists of funnel and flange, the mentioned flange is fixed on the funnel.

As an improvement of the utility model, also consisting of a supporting board to connect with the main frame, the mentioned supporting board is set with display and control panel.

As an improvement of the utility model, the mentioned power input end is connected with power switch, DC power adapter and controller through line in turn, the mentioned controller is respectively connected with display, control panel and electric motor.

As an improvement of the utility model, the mentioned powder storage device is also set with seal cover.

The utility model has the following beneficial effect:

1. The utility model powder output device can conveniently, fast, efficiently distribute powder;

2. In the distribution, the bottom of the utility model powder output device will not accumulate too many powders, the waste is less;

3. The utility model powder output device can set distribution quantity according to the requirement, the output quantity can be controlled;

4. The powder distribution device of the utility model powder output device has vibration structure, the vibration structure can ensure that the powder distribution device will not be adhered with too many powders, and can guarantee equal power output quantity each time.

In which:

1—powder storage device, 11—seal cover, 12—powder storage tank;

2—powder dispersion device, 21—rotation pick, 22—center shaft, 23—helical tooth transmission gear, 24—clamp nut, 25—shaft bolt;

3—powder distribution device, 31—rotation distribution part, 311—rotation vibration tooth, 312—groove, 32—main shaft, 321—spring, 322—seal end, 33—shell, 34—helical gear, 35—output groove, 36—protective shell, 37—main shaft groove, 38—axial compression board, 39—feed inlet;

4—powder unit, 41—electric motor, 42—gear box;

5—main frame, 51—shell, 52—controller, 53—DC power adapter, 54—supporting component, 55—power input end, 56—power switch, 57—fixing rack;

6—receiving device, 61—funnel, 62—flange;

7—display;

8—control panel, 81—button;

9—supporting board;

10—vessel.

DETAILED DESCRIPTION OF THE INVENTION

The utility model is further specified according to the attached figures.

Figure 1:
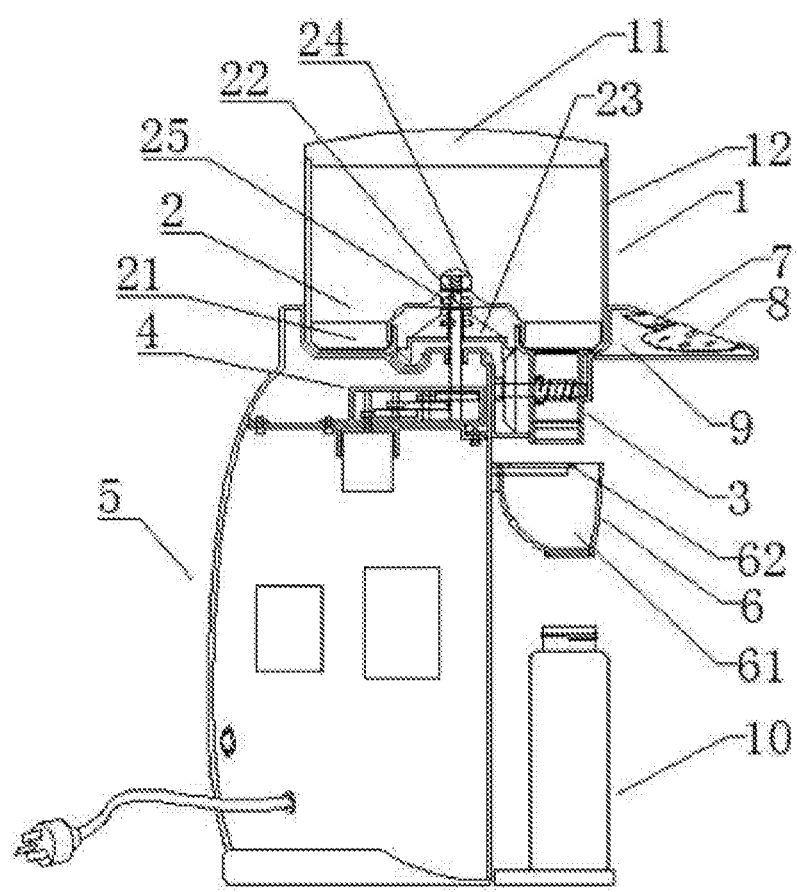
FIG. 1 Overall section view of the utility model.
Figure 2:
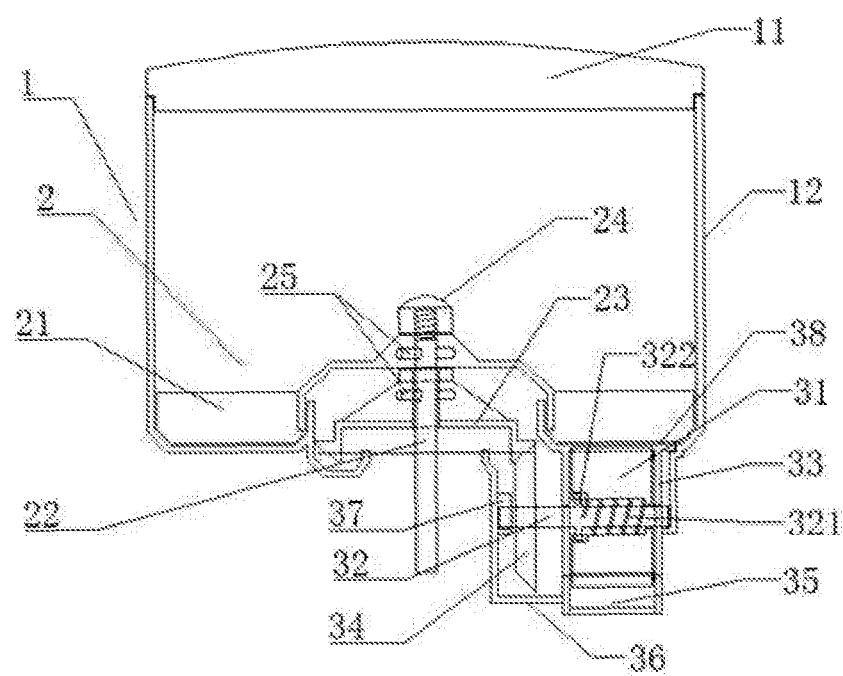
FIG. 2 Upper section view of the utility model.
Figure 3:
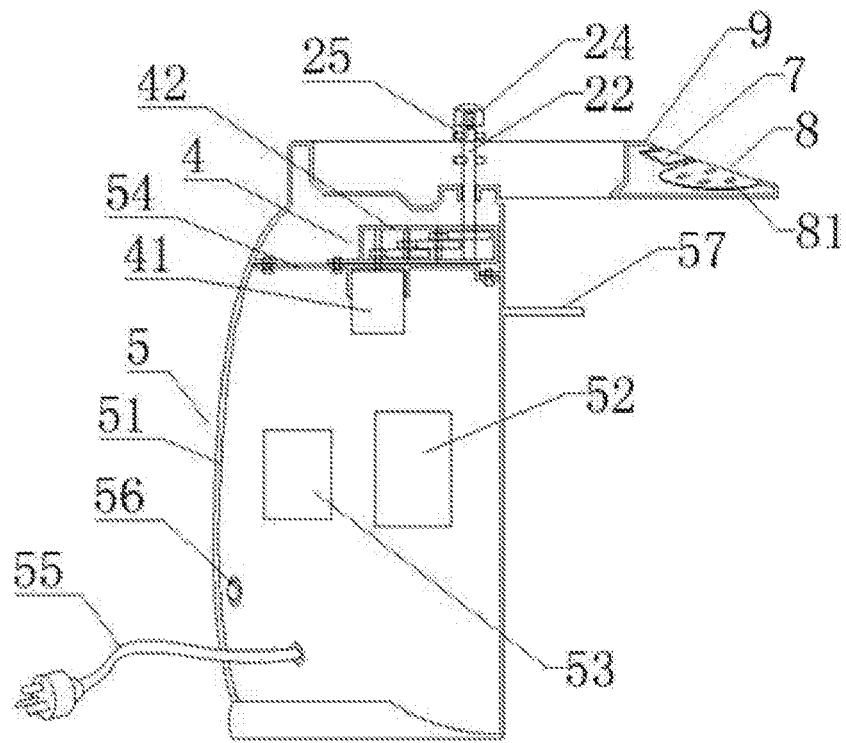
FIG. 3 Lower section view of the utility model.
Figure 4:
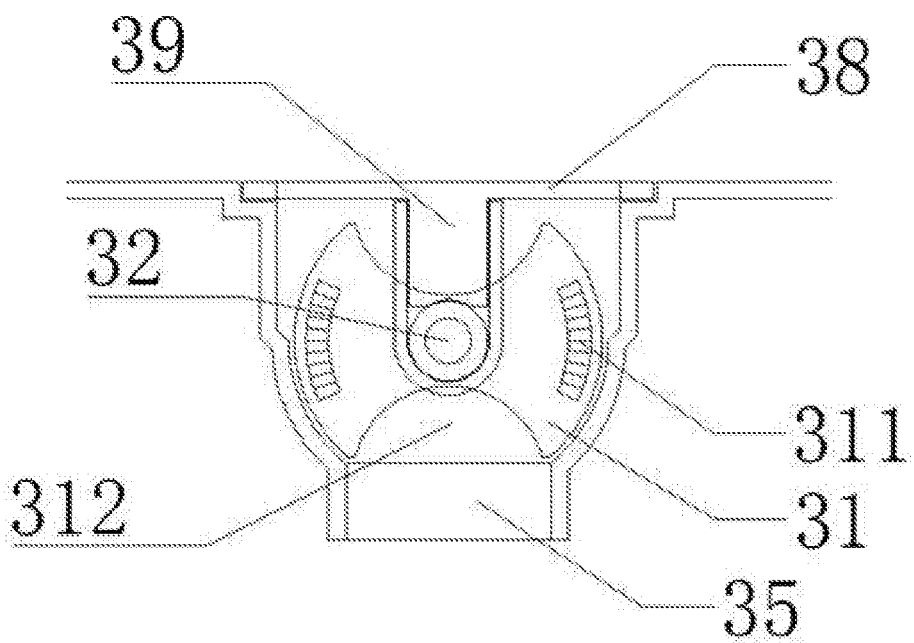
FIG. 4 Section view of powder distribution device of the utility model.
Figure 5:
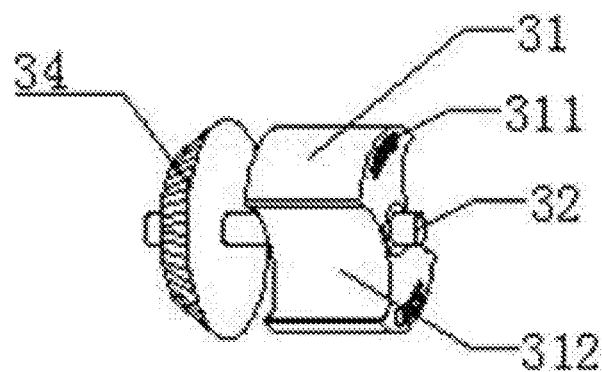
FIG. 5 Space diagram of powder distribution device of the utility model.
Figure 6:
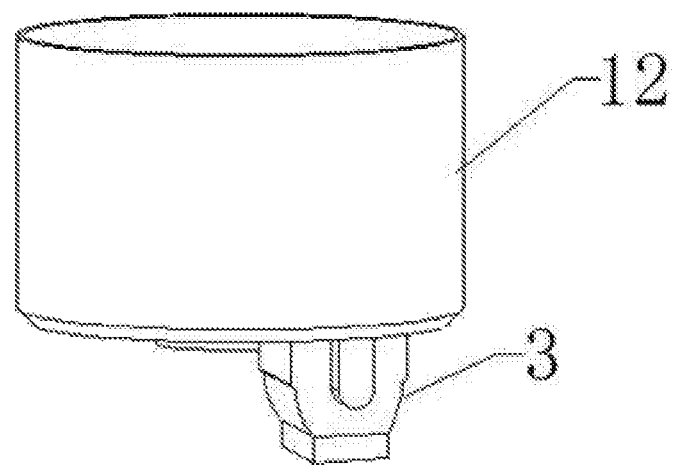
FIG. 6 Space diagram of powder storage device and powder distribution device of the utility model.
Figure 7:
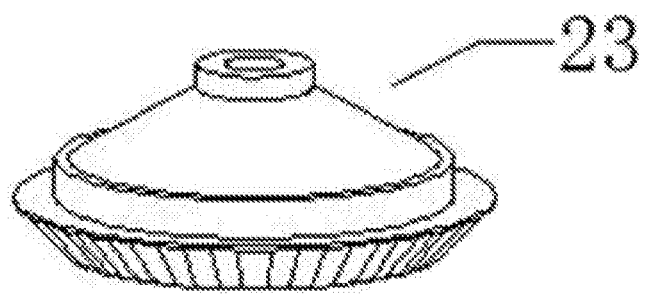
FIG. 7 Space diagram of helical tooth transmission gear of the utility model.
Figure 8:
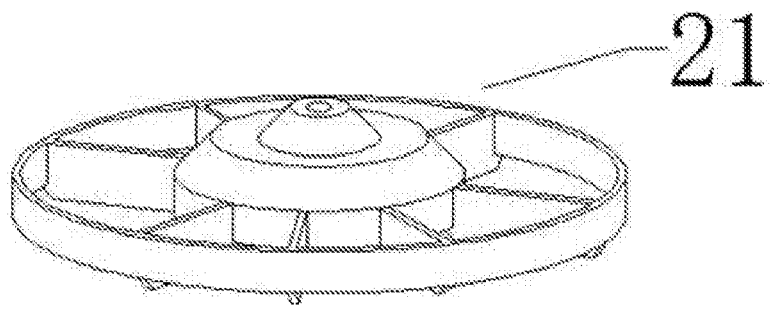
FIG. 8 Space diagram of rotation distribution part of the utility model.
Figure 9:
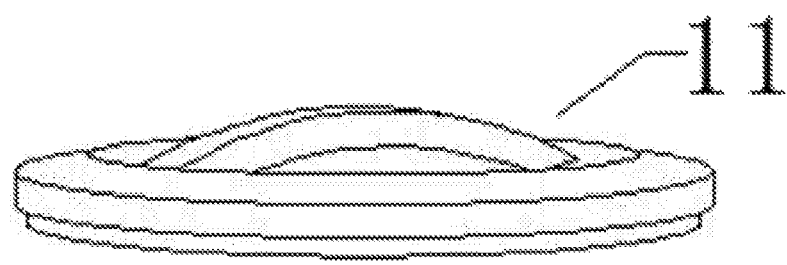
FIG. 9 Space diagram of seal cover of the utility model.

As FIG. 1, FIG. 2 and FIG. 3 a powder output device, consisting of powder storage device 1, powder dispersion device 2, powder distribution device 3, power unit 4, main frame 5, receiving device 6, display 7, control panel 8 and supporting board 9.

As FIG. 1, FIG. 2, FIG. 6 and FIG. 9 show, powder storage device 1 consists of seal cover 11 and powder storage tank 12, in which the bottom center area of powder storage tank 12 is set with center rotation hole and through hole set at the bottom to output powder.

As FIG. 1, FIG. 2, FIG. 7 and FIG. 8 show, powder dispersion device 2 is fixed in powder storage device 1, powder dispersion device 2 consists of rotation pick 21 and center shaft 22, the mentioned rotation pick 21 is fixed on center shaft 22, rotation pick 21 is fixed on center shaft 22 through the cooperation of shaft bolt 25 fixed on center shaft 22 and clamp nut 24 set on the top of center shaft 22, such design can facilitate disassembly and cleaning of rotation pick 21, the bell socketing area of the mentioned rotation pick 21 is located in the center are at the bottom of powder storage tank 12, the mentioned center shaft 22 is connected with gear box 42 of power unit 4 after extending out of the center rotation hole at the bottom of powder storage tank 12; the mentioned center shaft 22 is also fixed with helical tooth transmission gear 23, the main shaft 32 of the mentioned powder distribution device is fixed with helical gear 34, the helical gear 34 and helical tooth transmission gear 23 are mutually meshed, the mentioned helical tooth transmission gear 23 drives helical gear 34 to rotate in rotation.

As FIG. 1, FIG. 2, FIG. 4, FIG. 5 and FIG. 6 show, powder distribution device 3 consists of rotation distribution part 31, main shaft 32, shell 33, helical gear 34, output groove 35, protective shell 36, main shaft groove 37, axial compression board 38, feed inlet 39, the mentioned main shaft is horizontally set, protective shell 36 is fixed on shell 33, one end of main shaft 32 is bell socketed on the side wall of shell 33, the other end is bell socketed in main shaft groove 37 on the side wall of protective shell 36, the mentioned rotation distribution part 31 is fixed on main shaft 32 in shell 33, helical gear 34 is fixed on main shaft 32 in protective shell 36, powder distribution device 3 is fixed under the mentioned powder storage device 1 and feed inlet 39 of powder distribution device is overlapped with the through hole of powder storage device, the mentioned feed inlet 39 is set on rotation distribution part 31, the mentioned output groove 35 is under rotation distribution part 31, the rotation distribution part 31 is set with two groove 312 to correspond with output groove 35 and feed inlet 39, used to receive powder, spring 321 is set in the space formed by main shaft 32 and rotation distribution part 31 and seal end 322 on main shaft 32 restrict spring 321 in the area bell socketed by rotation distribution part 31 and main shaft 32, the mentioned rotation distribution part 31 is set with rotation vibration tooth 311, fixed vibration tooth is set inside the mentioned shell 33 to correspond with the rotation vibration tooth 311, axial compression board 38 limits main shaft 32 and rotation distribution part 31.

As FIG. 1 and FIG. 3 show, power unit 4 consists of electric motor 41 and gear box 42, the mentioned electric motor 41 is connected with the power input end of gear box 42, the mentioned center shaft 22 is bell socketed in the power output end of gear box 42; power unit 4 is respectively connected with powder dispersion device 2 and powder distribution device.

Figure 10:
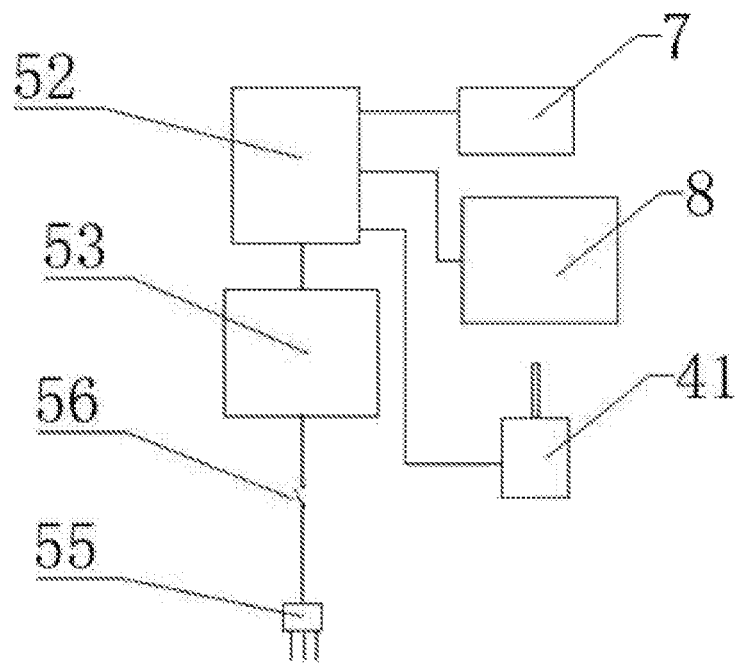
FIG. 10 Circuit diagram of the utility model.

As FIG. 1, FIG. 3 and FIG. 10 show, main frame 5 is set to correspond with powder storage device 1, the main frame 5 consists of shell 51, controller 52, DC power adapter 53, supporting component 54, power input end 55 and power switch 56, the mentioned controller 52, DC power adapter 53 and supporting component 54 are fixed in shell 51, one end of the mentioned power input end 55 is set in shell 51, the other end is set out of shell 51, the mentioned power switch 56 is set on shell 51, the mentioned power unit 4 is fixed on supporting component 54. The side wall of the mentioned shell 51 is fixed with fixing rack 57, the fixing rack 57 is fixe with receiving device 6 to correspond with powder distribution device 3, the receiving device 6 consists of funnel 61 and flange 62, the mentioned flange 62 is fixed on funnel 61. Also consisting of supporting board 9 fixed and connected with main frame 5, the mentioned supporting board 9 is set with display 7 and control panel 8, the control panel 8 is set with button 81. The mentioned power input end is connected with power switch 56, DC power adapter 53 and controller 52 through line in turn, the mentioned controller 52 is respectively connected with display 7, control panel 8 and electric motor 41.

The working flow of the powder output device issued by the utility model is as follows:

First, switch on power input end 55, switch on switch 56 at the same time, press button 81 on control panel 8, controller 52 receives the information passed from control panel 8 and starts electric motor 41 to start work, electric motor 41 passes power to center shaft 22 through gear box 42, center shaft 22 drives rotation pick 21 fixed on center shaft 22 and helical transmission gear 23 to rotate in rotation, helical tooth transmission hear 23 drives helical gear 34 to rotate in rotation, so as to complete powder dispersion and powder distribution. The power falls into vessel 10 through powder dispersion device 2 and powder distribution device 3 in turn from powder storage device; of course powder output device can used together with water supply device at the same time, solution can be prepared while the powder is output.

Aforesaid content is only the better implementation mode of the utility model, the utility model is not limited to aforesaid implementation mode, there may be local minor structure change in the implementation, if the changes or modifications of the invention are not out of the spirit and scope of the utility model, and are within the claims of the utility model and equal technical scope, the utility model also tends to contain these changes and modifications.

What is claimed is:

1. A powder output device, comprising a powder storage device (1), a powder dispersion device (2), powder distribution device (3), and a power unit (4), the powder dispersion device (2) is fixedly mounted inside the powder storage device (1), a bottom surface of the powder storage device (1) is provided with a through hole, the powder distribution device (3) is fixed under the powder storage device (1) and a feed inlet (39) of the powder distribution device (3) is overlapped with the through hole of the powder storage device (1), the power unit (4) is connected with the powder dispersion device (2) and the powder distribution device (3) respectively, wherein the powder distribution device (3) comprises a rotation distribution part (31), a main shaft (32), a shell (33), an outlet (35), and the feed inlet (39), the main shaft (32) is horizontally positioned, the rotation distribution part (31) is mounted on the main shaft (32) in the shell (33), at least one groove (312) is provided on the rotation distribution part (31) to correspond with the outlet (35) and the feed inlet (39); a spring (321) is mounted at a space formed by the main shaft (32) and the rotation distribution part (31), rotation vibration teeth (311) are provided on the rotation distribution part (31), fixed vibration teeth corresponding to the rotation vibration teeth (311) are provided inside the shell (33).

2. The powder output device according to claim 1, wherein the powder dispersion device (2) comprises a stirrer (21) and a center shaft (22), the stirrer (21) is fixed on the center shaft (22), the stirrer (21) is positioned at an inner bottom side of a powder storage tank (12), the center shaft (22) is connected with the power unit (4) after extending out of a bottom side of the powder storage tank (12).

3. The powder output device according to claim 2, wherein the power unit (4) comprises an electric motor (41) and a gear box (42), the electric motor (41) is connected with a power input end of the gear box (42), the center shaft (22) is engaged with a power output end of gear box (42).

4. The powder output device according to claim 1, wherein the center shaft (22) is provided with a helical toothed transmission gear (23), the main shaft (32) of the powder distribution device (3) is provided with a helical gear (34), the helical gear (34) meshes with the helical toothed transmission gear (23), the helical toothed transmission gear (23) drives the helical gear (34) to rotate.

5. The powder output device according to claim 1, also comprising a main frame (5) provided corresponding to powder storage device (1), the main frame (5) comprises a shell (51), a controller (52), a DC power adapter (53), a supporting component (54), a power input end (55) and a powder switch (56), the controller (52), the DC power adapter (53) and the supporting component (54) are fixed in the shell (51), one end of the power input end (55) is positioned inside the shell (51), another end of the power input end (55) is positioned out of the shell (51), the power switch (56) is provided on the shell (51), and the power unit (4) is fixed on the supporting component (54).

6. The powder output device according to claim 5, wherein a fixing rack (57) is fixedly connected with a side wall of the shell (51), a receiving device (6) is fixedly connected with the fixing rack (57) and positioned corresponding to powder distribution device (3), the receiving device (6) comprises a funnel (61) and a flange (62), the flange (62) is fixedly connected with an upper side of the funnel (61).

7. The powder output device according to claim 5, also comprising a supporting board (9) fixedly connected with the main frame (5), a display (7) and a control panel (8) are provided on the supporting board (9).

8. The powder output device according to claim 7, wherein the power input end (55) is connected with the power switch (56), the DC power adapter (53) and the controller (52) one by one through a power line, the controller (52) is connected with the display (7), the control panel (8) and the electric motor (41) respectively.

9. The powder output device according to claim 1, wherein the powder storage device (1) also comprises a seal cover (11).

* * * * *